US00RE43513E

(19) United States
(12) Reissued Patent
Solie et al.

(10) Patent Number: US RE43,513 E
(45) Date of Reissued Patent: Jul. 17, 2012

(54) METHOD AND APPARATUS FOR PREVENTING BOOSTING SYSTEM BUS WHEN CHARGING A BATTERY

(75) Inventors: Eric Magne Solie, Durham, NC (US); Thomas A. Jochum, Durham, NC (US)

(73) Assignee: Intersil Americas Inc., Milpitas, CA (US)

(21) Appl. No.: 12/951,693

(22) Filed: Nov. 22, 2010

Related U.S. Patent Documents

Reissue of:
(64) Patent No.: 7,235,955
Issued: Jun. 26, 2007
Appl. No.: 11/158,869
Filed: Jun. 22, 2005

U.S. Applications:
(63) Continuation of application No. 12/492,635, filed on Jun. 26, 2009, now Pat. No. Re. 42,142.

(60) Provisional application No. 60/591,203, filed on Jul. 26, 2004.

(51) Int. Cl.
*G05F 1/10* (2006.01)
*G05F 1/40* (2006.01)

(52) U.S. Cl. ..... 323/222; 323/284; 320/145

(58) Field of Classification Search ..... 323/222, 323/225, 241, 244, 235, 283, 284, 285, 288; 320/145
See application file for complete search history.

(56) References Cited

U.S. PATENT DOCUMENTS

| | | | | |
|---|---|---|---|---|
| 6,366,070 | B1 | 4/2002 | Cooke et al. | |
| 6,580,258 | B2 | 6/2003 | Wilcox et al. | |
| 6,812,676 | B2 | 11/2004 | Tateishi | |
| 6,979,985 | B2 | 12/2005 | Yoshida et al. | |
| 7,042,203 | B2 | 5/2006 | Van Der Horn et al. | |
| 7,170,197 | B2 | 1/2007 | Lopata | |
| 7,242,168 | B2 * | 7/2007 | Muller et al. | 323/222 |
| 7,245,113 | B2 | 7/2007 | Chen | |
| 7,498,791 | B2 | 3/2009 | Chen | |
| 2005/0258814 | A1 | 11/2005 | Chen | |

* cited by examiner

*Primary Examiner* — Jessica Han
(74) *Attorney, Agent, or Firm* — Fogg & Powers LLC

(57) ABSTRACT

A controllably alternating buck mode DC-DC converter conducts cycle by cycle analysis of the direction of inductor current flow to decide whether to operate in synchronous buck mode or standard buck mode for the next successive cycle. For each cycle of the PWM waveform controlling the buck mode DC-DC converter, a mode control circuit examines and latches data representative of the direction of inductor current flow relative to the chargeable battery. If the inductor current flow is positive, a decision is made to operate in synchronous buck mode for the next PWM cycle, which allows positive current to charge the battery; if the inductor current drops to zero, a decision is made to operate the converter in standard buck mode for the next PWM cycle, so as to prevent current from flowing out of the battery and boosting the system bus.

8 Claims, 4 Drawing Sheets

METHOD AND APPARATUS FOR PREVENTING BOOSTING SYSTEM BUS WHEN CHARGING A BATTERY

Matter enclosed in heavy brackets [ ] appears in the original patent but forms no part of this reissue specification; matter printed in italics indicates the additions made by reissue.

CROSS-REFERENCE TO RELATED APPLICATION

*Notice: More than one reissue application has been filed for the reissue of U.S. Pat. No. 7,235,955. The reissue applications are reissue application Ser. No. 12/492,635 (the parent reissue application), issued as U.S. Reissue Pat. No. RE42142; reissue application Ser. No. 12/951,716 (a sibling, continuation reissue); and reissue application Ser. No. 12/951,693 (the present, continuation reissue application). All three reissue applications are reissues of the same U.S. Pat. No. 7,235,955.*

*This continuation reissue application Ser. No. 12/951,693, filed Nov. 22, 2010 is a continuation of Ser. No. 12/492,635, filed Jun. 26, 2009, now reissued as RE42142, which is a reissue of Ser. No. 11/158,869, filed Jun. 22, 2005, now U.S. Pat. No. 7,235,955, which claims the benefit of U.S. Provisional Application Ser. No. 60/591,203, filed on Jul. 26, 2004.*

The present application claims the benefit of now abandoned U.S. patent application Ser. No. 60/591,203, filed Jul. 26, 2004, by Eric Solie et al, entitled: "Method to Prevent Boosting the System Bus When Charging the Battery," assigned to the assignee of the present application and the disclosure of which is incorporated herein.

FIELD OF THE INVENTION

The present invention relates in general to power supply systems and subsystems thereof, and is particularly directed to a method and apparatus for controllably switching the operation of a buck mode DC-DC converter between synchronous buck mode and standard buck mode in a manner that is effective to prevent boosting the voltage of the system bus in the course of the buck mode converter charging a battery.

BACKGROUND OF THE INVENTION

FIG. 1 is a reduced complexity circuit diagram of a typical synchronous buck mode DC-DC converter architecture for charging a battery by way of a voltage that is supplied to the charger circuitry and to downstream powered circuitry from an AC-DC adapter. As shown therein, a powered system bus 10 is coupled to a system power source such as an AC-DC adapter, which is operative to supply a prescribed DC voltage, such as a voltage value on the order of sixteen to nineteen volts DC, that is to be available for powering one or more system bus loads 12, which are connected between the powered bus 10 and a reference voltage bus 14, such as a zero volts or ground bus. In addition to supplying a DC voltage to system bus components, the system bus is employed to charge an auxiliary power storage device, such as a battery 16.

For this purpose, an upper controlled switch or MOSFET 21 and a lower controlled switch or MOSFET 23 have their source-drain paths coupled in series between the system bus 10 and the reference voltage bus 14. The gates of these two MOSFETs are adapted to be driven by respective (complementary) pulse width modulation (PWM) signals supplied thereto by a PWM controller. The common or phase node 25 between the upper MOSFET or UFET 21 and the lower MOSFET or LFET 23 is coupled by way of an inductor 27 to an output node 29 to which the battery 16, referenced to the ground bus 14, is coupled. In addition, a capacitor 33 is coupled between output node 29 and the ground reference bus 14.

Now although the use of a synchronous buck mode DC-DC converter architecture provides a relatively efficient mechanism for charging the battery, its operation can lead to the delivery of a negative or reverse current from the battery charger onto the system supply bus 10, thereby increasing the system bus voltage to unsafe levels that may damage downstream system components. Such a flow of negative current can result from a number of events, such as, but not limited to, soft starting the charger, inserting the battery, and removing the adapter voltage. In these events, the charger is operating open loop with a duty cycle that is lower than the closed loop duty cycle. It is possible to boost the system bus, if negative inductor current is flowing, namely, away from the battery opposite the direction of the arrow A, which shows the direction of positive inductor current flow into the battery, and when the system bus load is low (i.e., the powered system, such as a laptop computer is off and the battery is being charged). Current boosting into the system bus cannot go into the AC-DC adapter (as it is not designed to sink current), or be used by the load (which is turned off), so that the system bus voltage rises.

The mechanism through which negative current makes its way to the system bus is as follows. When the UFET 21 is turned off and the LFET 23 is turned on, the current in inductor 27 will decrease to zero and then become negative, and current will begin to flow from the battery through the inductor 27 in the negative direction, and down through the LFET to the return bus or ground. This is the current loop through which current will flow when the LFET 23 is on. When the LFET is turned off, the current that has built up in the inductor 27 cannot go through the LFET, and instead flows through the body diode of the UFET 21 to the supply bus 10, thereby undesirably boosting the supply bus voltage, typically by a value on the order of several or more volts—high enough to damage loads connected to the system bus.

To address this problem, designers of synchronous buck mode DC-DC converters have commonly employed a mechanism, known as diode emulation, which causes the LFET to behave as though it were a diode. In this diode emulation mode, the direction of current flow through the LFET is monitored. As long as current is flowing in the positive direction (from the source to the drain) the LFET 23 is allowed to be turned on. However, if the current reaches zero or goes negative, then the lower FET is turned off. This effectively makes the lower FET emulate a diode, in that the LFET allows positive current to flow through it (upwardly from the source to the drain and out through the inductor in the positive direction), but blocks current in the opposite or negative direction, in that no current is allowed to flow through the LFET in the drain-to-source direction, once the current reaches a zero value.

A reduced complexity schematic of a conventional circuit for implementing this diode-emulation control function is shown diagrammatically in FIG. 2, as comprising a phase comparator 40, having its positive or non-inverting (+) input 41 coupled to the drain and its negative or inverting (−) input 42 coupled to the source of LFET 23. The output of the phase comparator 40 is coupled to one input of a NOR gate 45, a second input of which is coupled to receive the PWM signal.

The output of NOR gate 45 is coupled through a driver 46 to the gate input of LFET 23. Similarly, the PWM signal is coupled through a driver 47 to the gate input of UFET 21, and further to a delay circuit 50, the output of which is coupled to the disable input of phase comparator 40. Delay circuit 50 is used to disable or 'blank' the operation of phase comparator 40 for a prescribed time delay (e.g., on the order of 200 ns) subsequent to the rising edge of the PWM signal, to allow ringing at the phase node 25 associated with the inductance of inductor 27 and the parasitic capacitance of the phase node 25 to subside sufficiently to allow an accurate measurement of current flow.

The operation of the circuit of FIG. 2 may be understood with reference to the set of waveforms shown in FIG. 3. When the PWM waveform shown at 300, transitions from high to low at time 301, the voltage at the phase node 25, which had previously been at Vin due to the conduction of UFET 21, will undergo negative ringing below zero volts as shown by the ringing portion 311 of phase node voltage waveform 310. Because the ringing associated with the PWM transition constitutes noise, the operation of the phase comparator 40 is blanked by the delay circuit 50 for a period of time that allows the ringing to subside. At the end of the ringing interval shown at 312, the phase node voltage is negative and begins a gradual transition towards zero volts as the inductor current gradually transitions towards zero as shown at 313. At this point, the inductor current can be validly measured.

A voltage representative of the inductor current is produced by the on-resistance of the LFET 23 and value of the negative inductor current flowing from the drain to the source of LFET 23. Because the source of LFET 23 is connected to ground, then when the current is positive—flowing from source to drain—the voltage at the phase node is actually below ground, as shown at 313, referenced above. Once the voltage at the phase node has increased to zero volts, at time 314, the output of the phase comparator 40 changes state and, via NOR gate 45, turns off the LFET 23, so that the LFET will act as a diode for negative inductor current.

The waveforms of FIG. 4 illustrate a fundamental problem with the mechanism employed in the circuit of FIG. 3. If diode emulation were not employed, then the PWM signal for controlling the turn on/off of the LFET 23 would be the complement of the PWM signal employed for the UFET 21. However, since diode emulation is controlled by the presence of the delay circuit 50, the NOR gate 45, and the phase comparator 40, the LFET 23 has a shorter on time than the inverse of PWM waveform applied to the gate of UFET 21. The top waveform 400 of FIG. 4 corresponds to the PWM signal that is applied to the gate UG of the UFET 21, while the bottom waveform 420 corresponds to the PWM signal that is applied to the gate LG of the LFET 23. The intermediate waveform 410 in FIG. 4 represents the variation in the inductor current through inductor 27.

As shown in FIG. 4, in response to the rising edge 401 in the PWM waveform 400 applied to the gate UG of the UFET 21, inductor current begins a positive ramp at 411, until the high-to-low transition 402 in the PWM waveform 400. In response to this transition, the UFET 21 is turned off, and the inductor current begins ramping down towards 0 amps, as shown at 412. In addition, when the PWM waveform applied to gate of the UFET 21 goes low, the waveform 420 applied to the gate of the LFET 23 goes high at 421, thereby turning on the LFET 23. During the interval between the high-to-low transition 402 in the PWM waveform applied to gate UG of the UFET 21 and the time 413 at which the inductor current reaches zero, positive inductor current is being supplied by the LFET 23, which has been turned on by the low-to-high 421 transition in the LG PWM signal 420.

The positive inductor current being supplied by LFET 23 flows from its source, which is at ground potential, to its drain, which is at a phase node voltage negative with respect to ground. When the inductor current reaches zero amps (0 A) at time 413, one would like to turn off the LFET 23. However, due to the use of the delay/blanking interval 414, the inductor current is not being monitored, so that no turn off signal is applied to the gate of the LFET 23. Instead, the inductor current continues to decrease well below zero amps, as shown at 415. Finally, at the end of the blanking interval, the output of the phase comparator 40, which has detected that Vd>Vs, is allowed to indicate that negative inductor current has been detected, and the LFET 23 is turned off. This is shown in FIG. 4 by the high-to-low transition 422 of the gate control waveform LG 420 to the gate input of the LFET 23.

When the LFET 23 turns off, the phase node 25 will go from zero volts to a diode drop above Vin, so that the body diode of UFET 21 is conducting. With both UFET 21 and LFET 23 now turned off, the negative polarity inductor current begins to ramp up towards zero amps, as shown at 416. During this transition, the negative inductor current is flowing through the body diode of the UFET 21. Eventually, at 417, the ramping up negative current reaches zero amps and the cycle described above repeats.

An examination of the inductor current waveform 410 reveals that the average inductor current is negative, as shown by broken lines 418. This means that an average negative current is being supplied by the battery into the system bus—placing the system bus 10 at an undesirably high voltage value. It will be readily appreciated, therefore, that within the blanking interval 414 a fairly large negative inductor current is realized. If the battery voltage is relatively high and the value L of the inductor 27 is relatively low, then di/dt is relatively large; namely, the inductor current reaches a relatively large negative value within a relatively small window of time. One way to mitigate against this effect is to reduce the blanking interval. However, doing so creates the risk that the phase comparator will trigger on a ringing edge rather than on a true zero-crossing ramp, as described above with reference to FIG. 3. As pointed out above, the ringing is due to the parasitic capacitance of the phase node and the value of the inductance. The blanking interval must be kept sufficiently wide to allow the ringing voltage at the phase node to subside. However, doing so means that there will be a fairly substantial average negative inductor current presented to the system bus, which is the problem to be solved.

SUMMARY OF THE PRESENT INVENTION

Pursuant to the present invention, shortcomings of prior art synchronous buck mode-based battery chargers, including those described above with reference to FIGS. 1-4, are successfully remedied by a controllably alternating buck mode DC-DC converter, that is selectively switched between synchronous buck mode and standard buck mode, in a manner that is effective to prevent boosting the voltage of the system bus in the course of the buck mode converter charging a battery. For this purpose, the invention comprises a memory augmentation to the prior art circuit of FIG. 2, described above, that examines and latches a data bit representative of the direction of inductor current flow relative to the chargeable battery for each cycle of the PWM waveform that controls the operation of the buck mode DC-DC converter. If the direction of output inductor current flow is positive (into the battery) at the rising edge of PWM, the converter is operated in synchronous buck mode for the next PWM cycle, on the other hand, if the direction of current flow at the rising edge of PWM is tending to be negative (out of the battery), in particular if the inductor current drops to zero, the converter is operated in standard buck mode for the next PWM cycle, so as to prevent current from flowing out of the battery and boosting the system bus.

To this end, the memory augmentation of the buck mode DC-DC converter circuit of FIG. 2 involves the incorporation of a D-type flip-flop having its D input coupled to the output of the phase comparator, its clock input CK coupled to receive the PWM waveform, and its Q output coupled as an additional input to the NOR gate. The state of the Q output of the flip-flop determines whether the converter is to operate in synchronous buck mode or standard buck mode. When operating in standard buck mode, the Q output of the flip-flop is latched high, which keeps the LFET turned off, so that the converter is effectively configured as a standard buck mode converter, having a PWM controlled UFET and a body diode of the LFET. Since, in this mode, the LFET operates as a diode, inductor current is prevented from going negative, as the body diode of the LFET will effectively block negative current flow. Therefore, where inductor current shows a tendency to or 'starts' to go negative (i.e. drops to zero) within the blanking interval, the LFET's body diode will block the current the moment the inductor current reaches zero amps.

The flip-flop monitors the output of phase comparator on the rising edge of the PWM waveform, which serves as the clock (CK) input to the flip-flop. The flip-flop latches the state of the phase comparator and uses this stored information for the next PWM cycle. If, on the rising edge of the PWM waveform, the phase comparator indicates that the inductor current is positive (into the battery), the LFET is allowed to turn on. Namely, where the inductor current is positive, the drain of the LFET will be below ground; therefore, the output of the phase comparator goes low ('0'), which is clocked into the flip-flop, so that the Q output of flip-flop goes low. As a consequence, two of the three inputs to the NOR gate are low, so that the NOR gate will be effectively controlled by its remaining input, which is the PWM waveform. Therefore, in response to a low-to-high transition in the PWM waveform, the output of the NOR gate goes low, so that the LFET will be turned off. Until the next rising edge of the PWM waveform, the Q output of flip-flop will remain low for an entire PWM period. Since the Q output of the flip-flop is low, the next time the PWM waveform goes low, all inputs to the NOR gate will be low, so that the output of the NOR gate will be high ('1'), thereby turning on the LFET, so that the converter operates in synchronous buck mode.

If, on the other hand, on the rising edge of the PWM waveform, the inductor current has dropped to zero, then the drain of the LFET will be positive (above ground). As a result, the output of the phase comparator will be high. This high ('1') state is clocked into the flip-flop on the rising edge of the PWM waveform, so that the Q output of the flip-flop is high ('1'). Since a high on any input of the NOR gate will force its output low, the low output of the NOR gate will now force the LFET to be turned off for the entire period. In this condition, the LFET behaves as a diode, so that the converter operates as a standard buck mode converter.

DETAILED DESCRIPTION

Figure 1:
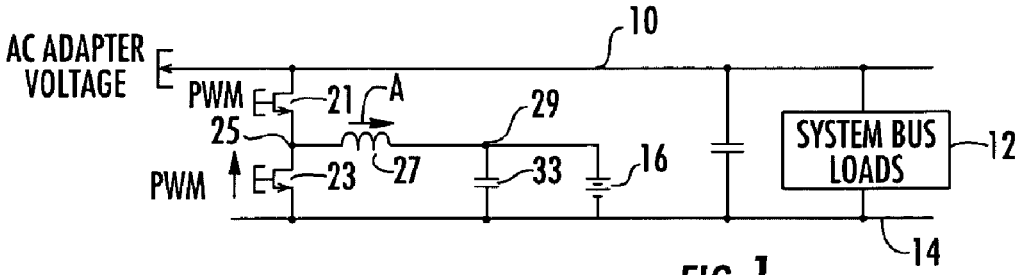
FIG. 1 (PRIOR ART)
FIG. 1 is a reduced complexity circuit diagram of a typical synchronous buck mode DC-DC converter for charging a battery by way of a voltage that is supplied to the charger circuitry and to downstream powered circuitry from an AC-DC adapter.
Figure 2:
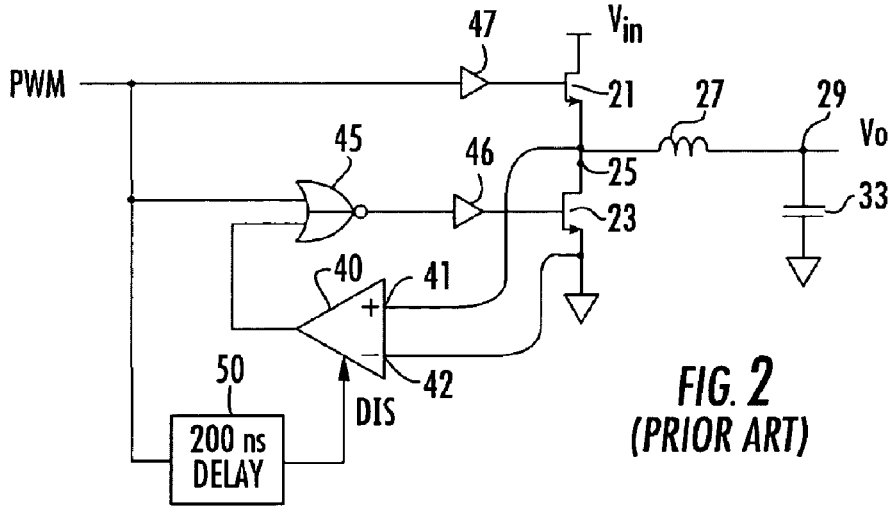
FIG. 2 (PRIOR ART)
FIG. 2 is a reduced complexity schematic of a conventional circuit for implementing a diode-emulation control function in a synchronous buck mode DC-DC converter of the type shown in FIG. 1.
Figure 3:
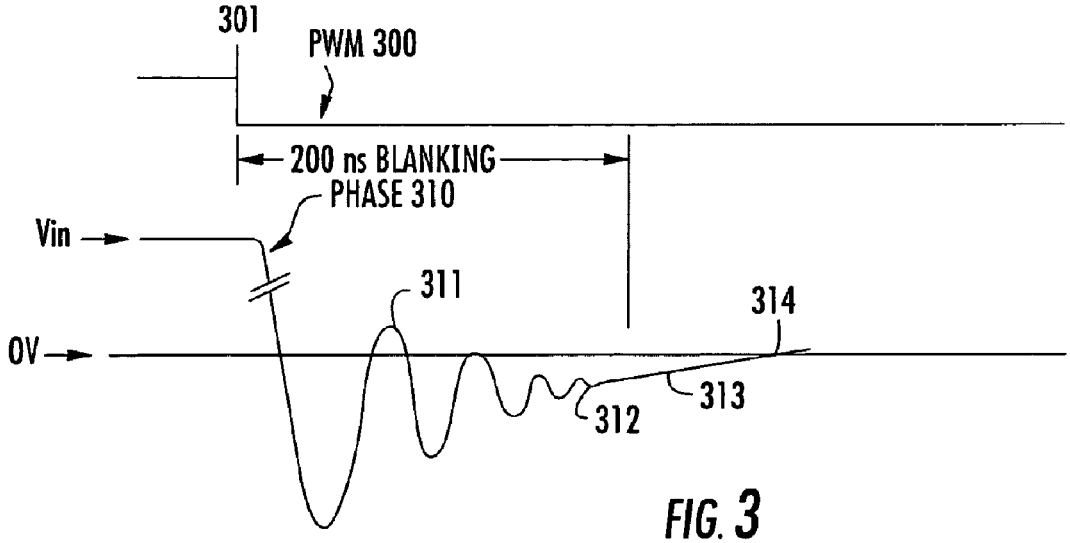
FIG. 3 (PRIOR ART)
FIGS. 3 and 4 are respective sets of waveforms associated with the operation of the circuit of FIG. 2.
Figure 5:
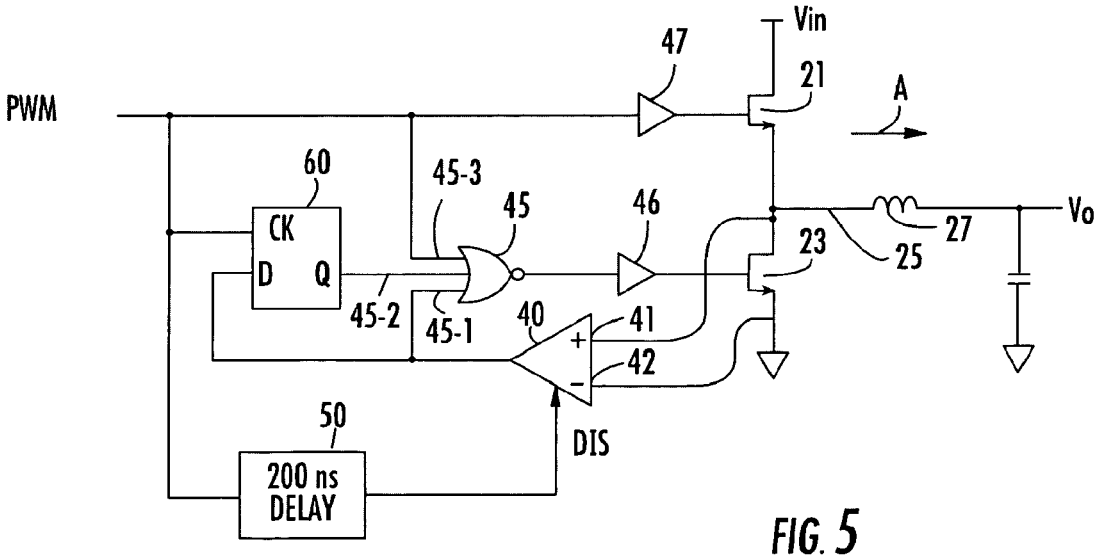
FIG. 5 shows a memory augmentation of the buck mode DC-DC converter circuit of FIG. 2 in accordance with an embodiment of the present invention, that controllably switches the converter between synchronous buck mode and standard buck mode operation, in a manner that is effective to prevent boosting the voltage of the system bus.

Attention is now directed to FIG. 5, which shows a modification of the buck mode DC-DC converter circuit of FIG. 2 in accordance with an embodiment of the present invention, to include a memory element that is used to selectively latch the output of the phase detector and thereby control the switching of the operation of the converter between synchronous buck mode and standard buck mode operation, in a manner that is effective to prevent boosting the voltage of the system bus. In particular, FIG. 5 shows the addition of a D-type flip-flop 60 having its D input coupled to the output of the phase comparator 40, its clock input CK coupled to receive the PWM waveform, and its Q output coupled as an additional input to NOR gate 45. As will be described below, the state of the Q output of flip-flop 60 determines whether the converter is to operate in synchronous buck mode or standard buck mode.

Figure 4:
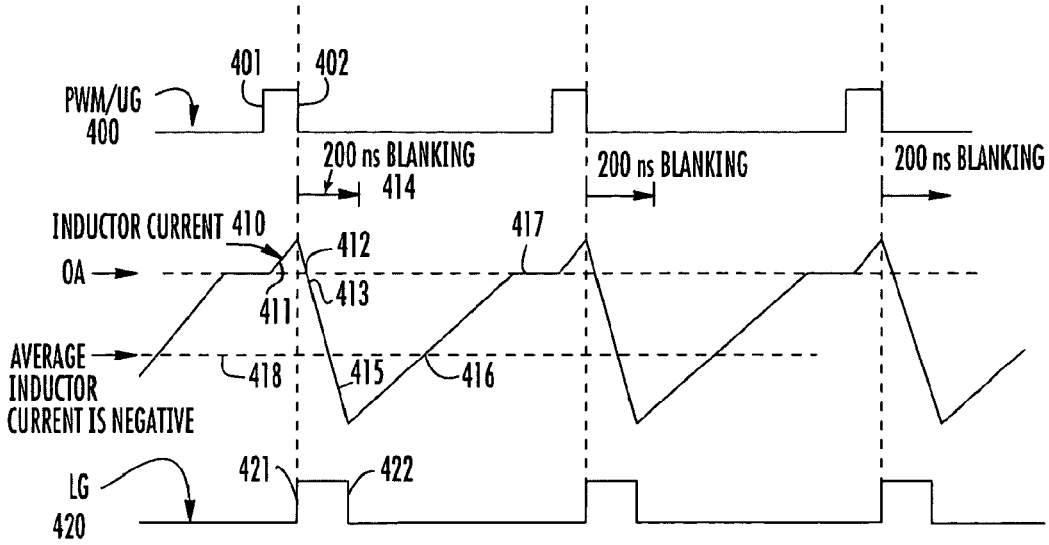
FIG. 4 (PRIOR ART)

When operating in standard buck mode, LFET 23 is held off, so that only its body diode participates in the operation of the circuit. Namely, when the Q output of flip-flop 60 is such as to hold LFET 23 turned off, the converter is effectively configured as a standard buck mode converter having a PWM controlled UFET 21 and a diode LFET 23. Since, in this mode, the LFET operates as a diode, inductor current is prevented from going negative, since the body diode of the LFET will effectively block negative current flow. Therefore, even if, as in waveform diagram of FIG. 4, inductor current shows a tendency to or 'starts' to go negative (i.e. drops to zero) within the blanking interval, the LFET's body diode will block the current the moment the inductor current reaches zero amps. It may be noted that if both the UFET and the LFET are turned off, and the inductor current is positive, it flows through the body diode of the UFET.

The function of the flip-flop 60 is to monitor the output of phase comparator 40 on the rising edge of the PWM waveform, which serves as the clock (CK) input to the flip-flop. The flip-flop stores or remembers the state of the phase comparator and uses this stored information for the next PWM cycle. The phase comparator is used to indicate in what direction inductor current is flowing. Namely, if, on the rising edge of the PWM waveform, phase comparator 40 indicates that the inductor current is positive (in the direction of arrow A into the battery), LFET 23 is allowed to turn on.

As pointed out above, if the inductor current is positive, the drain of LFET 23 is below ground; therefore, in response to a negative polarity voltage applied to the non-inverting (+) input 41, the output of phase comparator 40 goes low ('0'). This low or '0', in turn, is clocked into the D input of flip-flop 60, so that the Q output of flip-flop 60 goes low. As a consequence, the bottom two inputs 45-1 and 45-2 to NOR gate 45 are low, so that the controlling input to NOR gate 45 will be the PWM waveform, which is applied to input 45-3. By virtue of its NOR function, gate 45 will produce a '0' at its output if any of its inputs is a high or '1', and will produce a '1' at its output, only if all of its inputs are low ('0's).

Thus, in response to a low-to-high transition in the PWM waveform, which is applied to input 45-3 of NOR gate 45, the output of NOR gate 45 will be low, so that the LFET 23 will be turned off. Until the next rising edge of the PWM waveform, the Q output of flip-flop 60 will remain low for an entire PWM period. Since the Q output of flip-flop 60 is low, the next time PWM goes low, all of the inputs to the NOR gate 60 will be low, so that the output of the NOR gate will be high ('1'), thereby turning on LFET 23, so that the converter operates in synchronous buck mode.

If, on the other hand, on the rising edge of the PWM waveform, the inductor current has dropped to zero, then the drain of LFET 23 will be positive (above ground). As a result, the output of the phase comparator 40 will be high. This high ('1') state is clocked into the D input of flip-flop 60 on the rising edge of the PWM waveform, so that the Q output of flip-flop 60 is high ('1'). As pointed out above, a high on any input of NOR gate 45 will force its output low. Therefore, in this state, the output of NOR gate 45 will force LFET 23 to be turned off for the entire period. In this condition, LFET 23 behaves as a diode, so that the converter operates as a standard buck mode converter.

Figure 6:
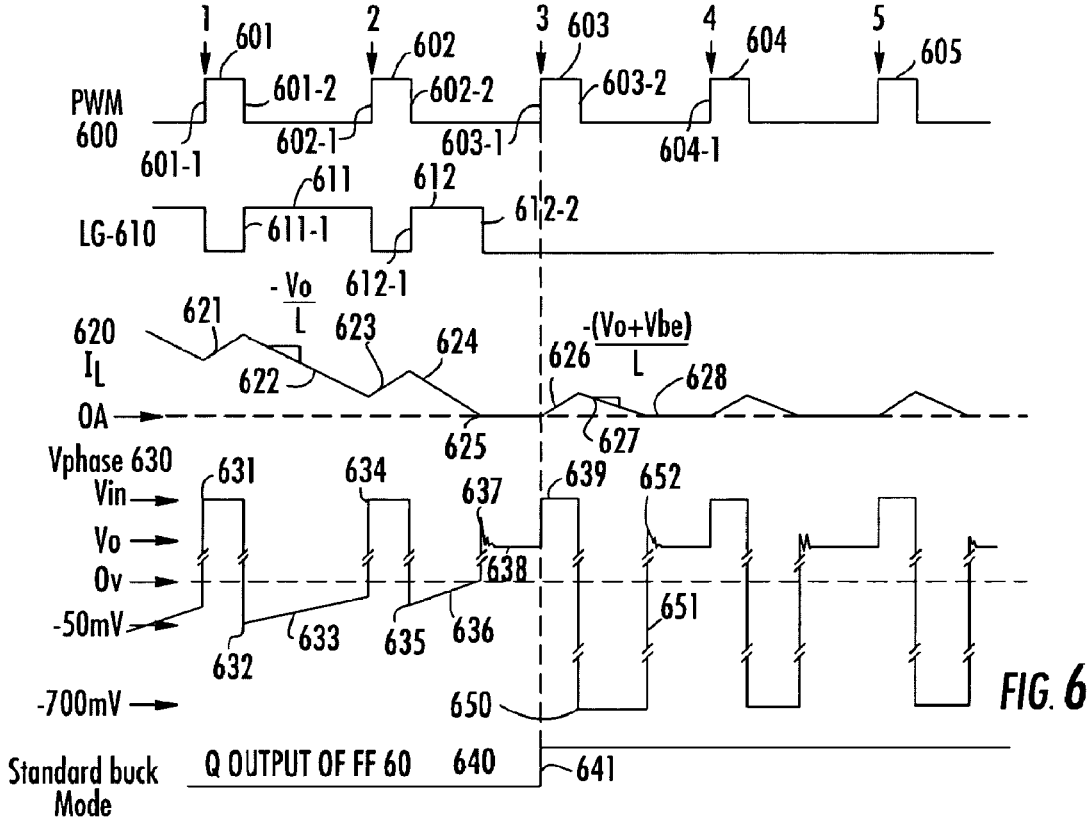
FIG. 6 is a set of waveforms showing a transition in the operation of the converter of FIG. 5 from synchronous buck mode to standard buck mode.
Figure 7:
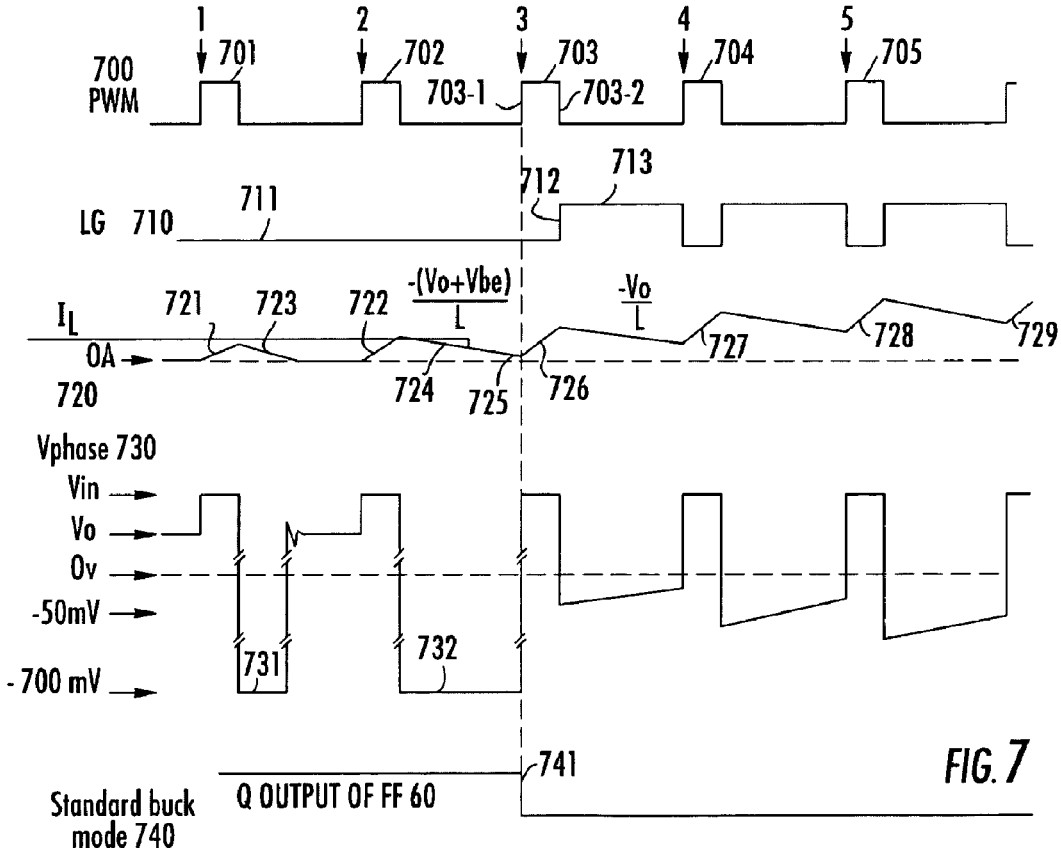
FIG. 7 is a set of waveforms showing a transition in the operation of the converter of FIG. 5 from standard buck mode to synchronous buck mode.

The manner in which the memory function of flip-flop 60 is used to selectively switch the converter between standard buck mode and synchronous buck node may be readily understood with reference to FIGS. 6 and 7, wherein FIG. 6 is a set of waveforms showing a transition in the operation of the converter from synchronous buck mode to standard buck mode (going from a high output current to a low output current), while FIG. 7 is a set of waveforms showing a transition in the operation of the converter from standard buck mode to synchronous buck mode (going from a low output current to a high output current).

Referring now to FIG. 6, an upper PWM waveform 600 is shown as comprising a sequence of PWM pulses 601, 602, 603, 604, 605, . . . , which are applied to the gate of UFET 21. As will be described over the course of this sequence of PWM pulses, the converter of FIG. 5 is operative to transition from synchronous buck mode to standard buck mode. With the converter initially operating in synchronous buck mode, then at the rising edge 601-1 of the first PWM pulse 601 of PWM waveform 600, UFET 21 is turned on, and at the falling edge 601-2 of PWM pulse 601, which corresponds to the rising edge 611-1 of pulse 611 of the drive waveform 610 (LG) to the gate of LFET 23, LFET 23 is turned on. Namely, being in synchronous buck mode, the PWM drive to LFET 23 is complementary to the PWM drive to UFET 21. As is further shown in the inductor current waveform 620, during this time the inductor current is incrementally ramping down; there is an increasing ramp 621 in the inductor current during the high state of the PWM pulse 601, and a decreasing ramp 622 in the inductor current during the high state of the LG pulse 611.

As can be seen from an examination of the left hand side of the inductor current waveform 620, during synchronous buck mode, the inductor current has a positive value. Waveform 630, which represents the voltage at the phase node 25, shows the phase node voltage transitioning to Vin at 631, when the UFET 21 is turned on by the PWM pulse 601 in the waveform 600, and then dropping at 632 to a prescribed voltage value below ground (e.g., on the order of −50 mV), when the UFET 21 is turned off and LFET 23 is turned on. Thereafter, as shown at 633, the phase node voltage gradually ramps up towards ground (zero volts) as the inductor current 622 decays.

The bottom waveform 640 shows the state of the Q output of the D flip-flop 60 during this time. As described above, during synchronous buck mode, the low output of phase comparator 40 is clocked into D flip-flop 60 and its Q output remains low for a complete cycle. Since the Q output of flip-flop 60 is low, the next time PWM goes low, all of the inputs to the NOR gate 60 will be low, so that the output of the NOR gate will be high ('1'), thereby turning on LFET 23, and the converter operates in synchronous buck mode.

Referring again to the upper PWM waveform 600, at the rising edge 602-1 of the second PWM pulse 602, UFET 21 is again turned on, and at the falling edge 602-2 of PWM pulse 602, which corresponds to the rising edge 612-1 of pulse 612 of the drive waveform 610 (LG) to the gate of LFET 23, UFET 21 is turned off, and LFET 23 is turned on. Namely, still being in synchronous buck mode, the PWM drive to LFET 23 is complementary to the PWM drive to UFET 21.

In the inductor current waveform 620, the inductor current continues to incrementally ramp down toward zero amps; there is another increasing ramp 623 in inductor current during the high state of the PWM pulse 602, and a decreasing ramp 624 in inductor current during the high state of the LG pulse 612. During the high state of the PWM pulse 602, the phase node voltage is again at the input voltage Vin, as shown at 634, as UFET 21 is turned on by pulse 602 in the PWM waveform 600, and then drops at 635 to a voltage value below ground (e.g., on the order of −25 mV), when the UFET 21 is turned off and LFET 23 is turned on. As shown at 636, the phase node voltage gradually ramps up towards ground (zero volts) as the inductor current 624 decays.

During the high state of the LG pulse 612, the inductor current has a decreasing ramp 624. However, unlike the previous cycle, rather than being at a positive current value when the next PWM pulse is asserted, ramp 624 reaches zero at time 625 prior to the next PWM pulse 603. As described above, in accordance with the operation of the converter of FIG. 5, when the inductor current drops to zero amps, the output of the phase comparator 40 goes high, so that the output of NOR gate 45 goes low, and LFET 23 is turned off, as shown at high-to-low transition edge 612-2 of waveform 610. With LFET 23 being turned off, the phase node voltage rings from zero volts up to Vout (Vo), as shown at 637, and then stays at Vo, as shown at 638 in waveform 630.

At the rising edge 603-1 of the next PWM pulse 603, the high ('1') output of phase comparator 40 will be clocked into flip-flop 60, so that its Q output goes high, as shown at 641 of waveform 640, which represents the Q state of flip-flop 60, and holds LFET 23 off. UFET 21 is turned on by the rising edge 603-1 of PWM pulse 603, so that the phase node voltage rises to Vin, as shown at 639; in addition, the inductor current begins ramping up, as shown by increasing ramp portion 626 of inductor current waveform 620. Next, on the falling edge 603-2 of PWM pulse 603, since the Q output of flip-flop 60 is high, LFET 23 is prevented from turning on. As a result, the LG waveform 610 remains low, so that when UFET 21 turns off at 603-2, positive inductor current will flow through the LFET 23 body diode and pull the drain of the LFET one diode drop below ground. The phase node voltage therefore drops to a value on the order of −700 mV, as shown at 650 in the phase node voltage waveform 630, as current is flowing from the source to the drain of LFET 23.

In response to the falling edge 603-2 of PWM pulse 603, UFET 21 is turned off and inductor current begins to ramp down toward zero, as shown at 627 in the inductor current waveform 620. When the inductor current reaches zero at 628, the phase node voltage will rise, as shown as 651 in phase node voltage waveform 630. When the phase node voltage rises above zero volts, the body diode of LFET 23 will block current, therefore the inductor current will stop decreasing and will stay at zero amps. The phase node voltage will then ring up to the output voltage level as shown at 652 of phase node voltage waveform 630.

In standard buck mode operation, when UFET 21 is turned on (by a rising edge in the PWM waveform), inductor current is positive and rises; then, when the UFET 21 is turned off (as the PWM waveform transitions low), current will flow through the body diode of the LFET 23 until the inductor current reaches zero, at which time the phase node voltage will rise to the value of Vout or the battery voltage. There is no current flowing through the inductor, therefore no voltage drop across the inductor, so that the phase node voltage equals Vout.

On the next rising edge of the PWM waveform, namely, the rising edge 604-1 of PWM pulse 604, with the phase node voltage being very positive (Vout), the output of phase comparator 40 is high, which again gets clocked into the flip-flop 60 maintaining its Q output high, and forcing the output of NOR gate 45 to remain low ('0'), so that the LFET 23 is maintained off, thus sustaining standard buck mode operation at low current for the next cycle of the PWM waveform. This operation is repeated for each PWM cycle, so that the mode in which the converter is to operate is determined on a cycle by cycle basis on the rising edge of each PWM pulse.

From the foregoing it will be appreciated that the state of the Q output of flip-flop 60 defines the mode of operation of the converter. If the Q output is low, the converter operates in synchronous buck mode allowing the LFET 23 to be turned on; if the Q output is high, the converter operates in standard buck mode, wherein LFET 23 is maintained off.

Attention is now directed to FIG. 7, which is a set of waveforms showing a transition in the operation of the converter from standard buck mode to synchronous buck mode (going from a low output current to a high output current). Again, as in the case of FIG. 6, FIG. 7 depicts an upper PWM waveform 700, containing a sequence of PWM pulses 701, 702, 703, 704, 705, . . . , which are applied to the gate of UFET 21. As will be described, over the course of this sequence of PWM pulses, the converter of FIG. 5 is operative to transition from standard buck mode to synchronous buck mode.

With the converter initially operating in standard buck mode, then, on the rising edges of the first two PWM pulse 701 and 702 of PWM waveform 700 when UFET 21 is turned on, the phase node voltage is at Vout, which means that the output of phase comparator 40 will be high ('1'). This high output of the phase comparator is clocked into flip-flop 60, so that its Q output is high, forcing the output of NOR gate 45 to be low, and thereby maintaining the gate drive LG to LFET 23 low so, as shown at the low portion 711 of waveform 710, and keeping LFET 23 turned off, as described above, in connection with the standard buck mode operation of FIG. 6.

During the on times of the PWM pulses, UFET 21 is turned on, so that inductor current ramps up from zero amps as shown at 721 and 722 in inductor current waveform 720. When UFET 21 is turned off in response to the high-to-low transitions of the pulses 701 and 702 in the PWM waveform, the inductor current gradually ramps down through the body diode toward zero, as shown at 723 and 724. This pulls the phase node a body diode below ground (e.g., on the order of −700 mV) as shown at 731 and 732 in waveform 730. Because of the body diode, the slope of the decrease in inductor current is proportional to the sum of the output voltage Vout and the body diode voltage drop Vbe.

At rising edge 703-1 of PWM pulse 703, the positive inductor current has not yet decreased to zero amps, as shown at 725, and the phase node 25 is still a body diode voltage drop (−700 mV) less than zero volts. Since this voltage is coupled to the non-inverting (+) input 41 of the phase comparator 40, the output of the phase comparator goes low. This low output is applied to the D input of flip-flop 60, and is clocked into the flip-flop 60 on the rising edge 703-1 of PWM pulse 703. The Q output of flip-flop 60 is now low, as shown at transition 741 in the flip-flop Q waveform 740, so that inputs 45-2 and 45-1 to NOR gate 45 are both low.

This represents a transition from standard buck mode to synchronous buck mode. NOR gate input 45-3 is high, due to the high state of PWM pulse 703. The falling edge 703-2 of PWM pulse 703 causes all inputs to the NOR gate 45 to be low, so that the output of NOR gate 45 goes high, whereby the control waveform 710 applied to the gate of LFET 23 goes high, as shown at 712 in waveform 710, turning on LFET 23. The operation of the converter now proceeds as described above with reference to FIG. 6 for the synchronous mode of operation, with the gate drive to the LFET 23 being the complement of the gate drive to the UFET 21, which is the PWM waveform. This causes the inductor current to gradually ramp up, as shown at inductor current ramp segments 726-727-728-729.

As shown in the phase node voltage waveform 730, the phase node voltage ramps up slowly, but is still negative (e.g., on the order of −10 mV), due to the drop across the on-resistance of the LFET 23. Since the inductor current is positive, the phase node voltage is slightly negative; with the phase node voltage being negative, a low is repetitively clocked out from the phase comparator 45 into the D input of flip-flop 60, so that its Q output is low ('0'), whereby inputs 45-2 and 45-1 to NOR gate 45 remain low. This allows the change in state of the PWM input 45-3 to repetitively turn on LFET 23 during the low state of the PWM waveform.

Figure 8:
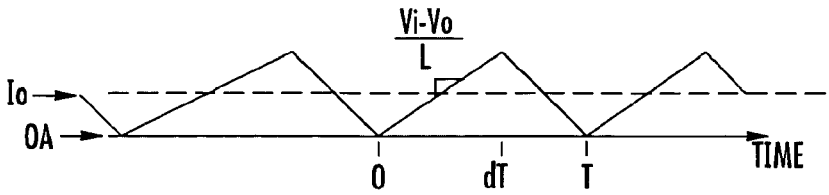
FIG. 8 is an inductor current waveform associated with the operation of FIG. 5.

The point at which a transition occurs between the two operational modes (synchronous buck mode and standard buck mode) of the converter of FIG. 5, may be readily understood by reference to the inductor current waveform of FIG. 8. The transition between the two modes will occur at a continuous conduction mode—discontinuous conduction mode boundary, namely just at a point wherein the inductor current reaches zero amps and ramps up on the next rising edge of the PWM waveform. In particular, FIG. 8 shows a variation of inductor current with time. For a positive current ramp, the slope (di/dt) is proportional to the difference between the value of system bus voltage (Vi) and battery voltage (Vout). As shown in FIG. 8, inductor current rises from zero amps to a peak current over a time duration dT. After the peak time dT, the inductor current ramps down to zero at time T. The slope (di/dt) of the falling ramp is equal to −Vout/L. By setting the change in current for a rising ramp to a change in current for a falling ramp equal to each other, the average value of inductor current Io can be determined. Using the basic inductor voltage/current relationship:

$$V=Ldi/dt,$$

then, $$(Vi-Vout)/L=2Io/dT=2Io/(T(Vo/Vi)).$$

Solving for Io, $$Io=(1-(Vout/Vi))Vo(T/2L).$$

It should be noted that in the course of transitioning from standard buck mode to synchronous buck mode, it is not possible to have negative inductor current. As noted above, the present invention prevents the flow of negative inductor current by discriminating between positive inductor current and 'tending' toward negative or 'zero' inductor current. If positive inductor current is flowing, the phase node voltage is one body diode drop (Vbe) below ground (e.g., −700 mV); for zero inductor current, the phase node voltage is equal to Vout.

When the converter is operating in standard buck mode, the slope of the falling ramp of the inductor current, namely di/dt, is equal to −(Vout+Vbe)/L, where L is the inductance of inductor 27, since LFET 23 has a body diode drop across it, as described above. When the converter is operating in synchronous buck mode, LFET 23 is no longer a diode, but is essentially shorted out, so that the Vbe term goes to zero. This changes the slope di/dt of the falling ramp to −Vout/L.

As will be appreciated from the foregoing description, drawbacks of a conventional synchronous buck mode-based battery charger of the type described above with reference to FIGS. 1-4, are effectively obviated by the controllably alternating buck mode DC-DC converter of the present invention, which uses a cycle by cycle analysis of the direction of inductor current flow to decide whether the converter is to operate in synchronous buck mode or standard buck mode for the next successive cycle. For each cycle of the PWM waveform, that controls the operation of the buck mode DC-DC converter, the invention examines and latches a data bit representative of the direction of inductor current flow relative to the chargeable battery. If the direction of output inductor current flow is positive, a decision is made that the converter is to operate in synchronous buck mode for the next PWM cycle, so as to allow positive current to charge the battery; on the other hand, if the inductor current drops to zero, a decision is made to operate the converter in standard buck mode for the next PWM cycle, so as to prevent current from flowing out of the battery and boosting the system bus.

It may be noted that an alternative methodology of the present invention involves an examination of more than one cycle of the waveform before switching the operational mode. As a non-limiting example, a decision could be made to switch modes after having three consecutive readings each of which indicates that a mode switch should be effected.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

[1. A controllably alternating buck mode DC-DC converter comprising:

an upper switching stage and a lower switching stage having controlled current flow paths therethrough coupled between an input voltage terminal adapted to receive an input voltage, and a reference voltage terminal adapted to receive a reference voltage, a common node between said upper switching stage and said lower switching stage being coupled through an output inductor to an output port for charging a battery, said upper switching stage having an upper control terminal to which a first pulse width modulation (PWM) waveform is applied for controlling the conduction and non-conduction of said upper switching stage, and wherein said lower switching stage has a lower control terminal to which a second PWM waveform, referenced to said first PWM waveform, is selectively applied for controlling the conduction and non-conduction of said lower switching stage; and a lower switching stage controller, which is operative, in response to a positive inductor current flow from said common node to said output port at the end of one or more cycles including a respective ith cycle of said first PWM waveform, to allow said second PWM waveform to be applied to said lower control terminal of said lower switching stage during the (i+1)th cycle of said first PWM waveform, and thereby cause said buck mode DC-DC converter to operate in synchronous buck mode for the (i+1)th cycle of said first PWM waveform, and in response to inductor current dropping to zero during said one or more cycles including said respective ith cycle of said first PWM waveform, to cause diode emulation of said lower switching stage during the (i+1)th cycle of said first PWM waveform, and thereby cause said buck mode DC-DC converter to operate in standard buck mode for the (i+1)th cycle of said first PWM waveform.]

[2. The DC-DC converter according to claim 1, wherein said lower switching stage controller is operative to store information representative of the direction of inductor current flow for said ith cycle of said first PWM waveform, and to selectively cause said buck mode DC-DC converter to operate in either synchronous buck mode or standard buck mode for the (i+1)th cycle of said first PWM waveform, based upon said information.]

[3. The DC-DC converter according to claim 2, wherein said lower switching stage controller comprises:

a phase detector having inputs thereof coupled across the current flow path through said second switching stage, and an output coupled to a logic circuit, a flip-flop having an input coupled to said output of said phase detector, a clock input coupled to receive said first PWM waveform, and an output coupled to said logic circuit, said logic circuit being coupled to receive said first PWM waveform and having an output coupled to said lower control terminal of said lower switching stage.]

[4. The DC-DC converter according to claim 3, wherein said lower switching stage controller further comprises a blanking circuit which is operative to controllably disable said phase detector for a prescribed period of time following the termination of said first PWM waveform.]

[5. The DC-DC converter according to claim 1, wherein, in response to a positive inductor current flow from said common node to said output port at the end of said one or more cycles including said respective ith cycle of said first PWM waveform, said lower switching stage controller is operative to generate said second PWM waveform as the complement of said first PWM waveform, for application to said lower control terminal of said lower switching stage during the (i+1)th cycle of said first PWM waveform, and thereby cause said buck mode DC-DC converter to operate in synchronous buck mode for the (i+1)th cycle of said first PWM waveform.]

[6. The DC-DC converter according to claim 1, wherein, in response to a zero inductor current during said one or more cycles including said respective ith cycle of said first PWM waveform, said lower switching stage controller is operative to prevent said second PWM waveform from being applied to said lower control terminal of said lower switching stage during the (i+l)th cycle of said first PWM waveform, and thereby cause said buck mode DC-DC converter to operate in standard buck mode for the (i+1)th cycle of said first PWM waveform.]

[7. The DC-DC converter according to claim 1, wherein said upper switching stage comprises an upper MOSFET and said lower switching stage comprises a lower MOSFET, and wherein said lower switching stage controller is operative, in response to a positive inductor current flow from said common node to said output port at the end of said one or more cycles including said respective ith cycle of said first PWM waveform, to allow said second PWM waveform to be applied to a gate terminal of said lower MOSFET stage during the (i+1)th cycle of said first PWM waveform, and thereby turn on said lower MOSFET and cause said buck mode DC-DC converter to operate in synchronous buck mode for the (i+1)th cycle of said first PWM waveform and, in response to inductor current dropping to zero during said one or more cycles including said respective ith cycle of said first PWM waveform, to turn off said lower MOSFET during the (i+1)th cycle of said first PWM waveform, and thereby cause said buck mode DC-DC converter to operate in standard buck mode for the (i+1)th cycle of said first PWM waveform.]

[8. A method of operating a buck mode DC-DC converter comprised of an upper switching stage and a lower switching stage having controlled current flow paths therethrough coupled between an input voltage terminal adapted to receive an input voltage, and a reference voltage terminal adapted to receive a reference voltage, a common node between said upper switching stage and said lower switching stage being coupled through an output inductor to an output port for charging a battery, said upper switching stage having an upper control terminal to which a first pulse width modulation (PWM) waveform is applied for controlling the conduction and non-conduction of said upper switching stage, and wherein said lower switching stage has a lower control terminal to which a second PWM waveform, referenced to said first PWM waveform, is selectively applied for controlling the conduction and non-conduction of said lower switching stage, said method comprising the steps of:

(a) in response to a positive inductor current flow from said common node to said output port at the end of each of one or more cycles including a respective ith cycle of said first PWM waveform, coupling said second PWM waveform to said lower control terminal of said lower switching stage during an (i+1)th cycle of said first PWM waveform, thereby causing said buck mode DC-DC converter to operate in synchronous buck mode for the (i+1)th cycle of said first PWM waveform; and (b) in response to inductor current dropping to zero during said one or more cycles including said respective ith cycle of said first PWM waveform, producing diode emulation of said lower switching stage during the (i+1) th cycle of said first PWM waveform, thereby causing said buck mode DC-DC converter to operate in standard buck mode for the (i+1)th cycle of said first PWM waveform.]

[9. The method according to claim 8, wherein step (a) comprises storing information representative of the direction of inductor current flow for said ith cycle of said first PWM waveform, and selectively causing said buck mode DC-DC converter to operate in synchronous buck mode for the (i+1)th cycle of said first PWM waveform, in response to said information being representative of positive inductor current flow.]

[10. The method according to claim 8, wherein step (b) comprises storing information representative of the direction of inductor current flow for said one or more cycles including said ith cycle of said first PWM waveform, and selectively causing said buck mode DC-DC converter to operate in standard buck mode for the (i+1)th cycle of said first PWM waveform, in response to said information being representative of zero inductor current flow.]

[11. The method according to claim 8, further comprising the step (c) of controllably disabling steps (a) and (b) for a prescribed period of time following the termination of said first PWM waveform.]

[12. The method according to claim 8, wherein, in response to a positive inductor current flow from said common node to said output port during said one or more cycles including said respective ith cycle of said first PWM waveform, step (a) comprises generating said second PWM waveform as the complement of said first PWM waveform, for application to said lower control terminal of said lower switching stage during the (i+1)th cycle of said first PWM waveform, thereby causing said buck mode DC-DC converter to operate in synchronous buck mode for the (i+1)th cycle of said first PWM waveform.]

[13. The method according to claim 8, wherein, in response to a zero inductor current during said one or more cycles including said respective ith cycle of said first PWM waveform, step (b) comprises preventing said second PWM waveform from being applied to said lower control terminal of said lower switching stage during the (i+1)th cycle of said first PWM waveform, thereby causing said buck mode DC-DC converter to operate in standard buck mode for the (i+1)th cycle of said first PWM waveform.]

[14. A controller for a buck mode DC-DC converter comprised of an upper switching stage and a lower switching stage having controlled current flow paths therethrough coupled between an input voltage terminal adapted to receive an input voltage, and a reference voltage terminal adapted to receive a reference voltage, a common node between said upper switching stage and said lower switching stage being coupled through an output inductor to an output port for charging a battery, said upper switching stage having an upper control terminal to which a first pulse width modulation (PWM) waveform is applied for controlling the conduction and non-conduction of said upper switching stage, and wherein said lower switching stage has a lower control terminal to which a second PWM waveform, referenced to said first PWM waveform, is selectively applied for controlling the conduction and non-conduction of said lower switching stage, said controller comprising:

a storage device which is operative to store information representative of the direction of inductor current flow for one or more cycles including an ith cycle of said first PWM waveform; and a logic circuit coupled to storage device and said lower switching stage and being operative to selectively cause said buck mode DC-DC converter to operate in one of synchronous buck mode and standard buck mode for an (i+1)th cycle of said first PWM waveform, based upon said information stored by said storage device.]

[15. The controller according to claim 14, wherein said logic circuit is operative, in response to a positive inductor current flow from said common node to said output port at the end of said one or more cycles including said ith cycle of said first PWM waveform, to allow said second PWM waveform to be applied to said lower control terminal of said lower switching stage during said (i+1)th cycle of said first PWM waveform, and thereby cause said buck mode DC-DC converter to operate in synchronous buck mode for the (i+1)th cycle of said first PWM waveform.]

[16. The controller according to claim 14, wherein said logic circuit is operative, in response to said inductor current being reduced to zero during one or more cycles including said ith cycle of said first PWM waveform, to cause diode emulation of said lower switching stage during the (i+1)th cycle of said first PWM waveform, and thereby cause said buck mode DC-DC converter to operate in standard buck mode for the (i+1)th cycle of said first PWM waveform.]

[17. The controller according to claim 14, further comprising a phase detector having inputs thereof coupled across the current flow path through said second switching stage, and an output coupled to said logic circuit, and wherein said memory device comprises a flip-flop having an input coupled to said output of said phase detector, a clock input coupled to receive said first PWM waveform, and an output coupled to said logic circuit, and wherein said logic circuit is coupled to receive said first PWM waveform and having an output coupled to said lower control terminal of said lower switching stage.]

[18. The controller according to claim 17, wherein said lower switching stage controller further comprises a blanking circuit which is operative to controllably disable said phase detector for a prescribed period of time following the termination of said first PWM waveform.]

[19. The controller according to claim 14, wherein, in response to a positive inductor current flow from said common node to said output port at the end of said one or more cycles including said ith cycle of said first PWM waveform, said logic circuit is operative to generate said second PWM waveform as the complement of said first PWM waveform, for application to said lower control terminal of said lower switching stage during the (i+1)th cycle of said first PWM waveform, and thereby cause said buck mode DC-DC converter to operate in synchronous buck mode for the (i+1)th cycle of said first PWM waveform.]

[20. The controller according to claim 14, wherein, in response to a zero inductor current during said one or more cycles including said ith cycle of said first PWM waveform, said logic circuit is operative to prevent said second PWM waveform from being applied to said lower control terminal of said lower switching stage during the (i+1)th cycle of said first PWM waveform, and thereby cause said buck mode DC-DC converter to operate in standard buck mode for the (i+1)th cycle of said first PWM waveform.]

*21. A buck mode DC-DC converter comprising:*

*an inductor coupled to a battery;*

*a high side switch having a first parallel diode, the high side switch coupled between the inductor and an input voltage source;*

*a low side switch having a second parallel diode, the low side switch coupled between the inductor and a reference voltage;*

*wherein the high side switch and the low side switch are operated by a pulse width modulation (PWM) control circuit to charge the battery from the input voltage source; and*

*a logic circuit that opens the low side switch for a whole switching cycle while the PWM control circuit continues to operate the high side switch if the inductor current reaches approximately zero during the preceding switching cycle, irrespective of the inductor current during the whole switching cycle.*

*22. The converter of claim 21, wherein opening the low side switch for a whole switching cycle, irrespective of the inductor current during the whole switching cycle, thereby operates the buck mode converter in standard mode during the whole switching cycle.*

*23. The converter of claim 21, whereby the high side and low side switches are implemented by MOSFET transistors and the first and second parallel diodes are implemented by the body diodes of the MOSFET transistors.*

*24. A buck mode DC-DC converter comprising:*

*a high side switch having a first parallel diode, the high side switch coupled between an inductor and an input voltage source;*

*a low side switch having a second parallel diode, the low side switch coupled between the inductor and a reference voltage;*

*wherein the high side switch and the low side switch are operated by a pulse width modulation (PWM) control circuit; and*

*a logic circuit that opens the low side switch while the PWM control circuit continues to operate the high side switch for a switching cycle when a signal related to inductor current drops below a threshold during the preceding switching cycle, irrespective of inductor current during the switching cycle, and wherein the logic circuit enables the low side switch when the inductor current reaches an output current threshold, irrespective of the inductor current during the switching cycle.*

*25. A switching stage controller, comprising:*

*a comparator that outputs a control signal based on a signal related to an inductor current flow;*

*wherein the control signal indicates a synchronous buck mode operation for an (i+1)th cycle of a pulse width modulation (PWM) waveform when the signal related to an inductor current flow is above a first threshold during an entire ith cycle of the PWM waveform, irrespective of the inductor current flow during the (i+1)th cycle; and*

*wherein the control signal indicates a standard buck mode operation for the (i+1)th cycle of the PWM waveform when the signal related to an inductor current flow falls below a second threshold during an ith cycle of the PWM waveform, irrespective of the inductor current flow during the (i+1)th cycle.*

*26. A controller for a voltage regulator, the controller comprising:*

*a pulse width modulation (PWM) generation circuit that is configured to generate PWM signals to control upper and lower switches in the voltage regulator;*

*a node adapted to receive a feedback signal related to an inductor current of the voltage regulator; and*

*a comparator, coupled to the node, that outputs a control signal based on the feedback signal related to the inductor current flow;*

*wherein the control signal indicates a synchronous buck mode operation for an (i+1)th cycle of a first PWM waveform of the PWM generation circuit when the signal related to an inductor current flow is above a first threshold during an entire ith cycle of the first PWM waveform and irrespective of the inductor current flow during the (i+1)th cycle; and*

*wherein the control signal indicates a standard buck mode operation for the (i+1)th cycle of the first PWM waveform of the PWM generation circuit when the signal related to an inductor current flow falls below a second threshold during an ith cycle of the first PWM waveform and irrespective of the inductor current flow during the (i+1)th cycle.*

*27. The controller of claim 26, further comprising a blanking circuit which is operative to controllably disable a phase detector for a prescribed period of time following a transition of the PWM waveform.*

*28. The controller of claim 26, wherein, in response to the inductor current flow above the first threshold at the end of one or more cycles including the ith cycle of the first PWM waveform and irrespective of the inductor current flow during the (i+1)th cycle, the PWM generation circuit generates a second PWM waveform, wherein a portion of the second PWM waveform is substantially complementary to a portion of the first PWM waveform.*

* * * * *